US009220368B2

(12) United States Patent
 Shingler (10) Patent No.: US 9,220,368 B2
(45) Date of Patent: *Dec. 29, 2015

(54) ELECTRIC COOKING APPARATUS

(71) Applicant: EVO, Inc., Beaverton, OR (US)

(72) Inventor: Robert A. Shingler, Beaverton, OR (US)

(73) Assignee: Evo, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/022,045

(22) Filed: Sep. 9, 2013

(65) Prior Publication Data

US 2014/0165851 A1    Jun. 19, 2014

Related U.S. Application Data

(63) Continuation of application No. 12/824,103, filed on Jun. 25, 2010, now Pat. No. 8,530,795.

(60) Provisional application No. 61/220,977, filed on Jun. 26, 2009.

(51) Int. Cl.
 *H05B 3/02* (2006.01)
 *A47J 37/06* (2006.01)
 (Continued)

(52) U.S. Cl.
 CPC . *A47J 37/06* (2013.01); *H05B 6/68* (2013.01); *H05B 3/20* (2013.01)

(58) Field of Classification Search
 CPC ............ A47J 27/06; H05B 6/68; H05B 1/00; H05B 1/0252; H05B 1/0258; H05B 1/0266; H05B 3/06; H05B 3/10; H05B 3/20; H05B 3/34; H05B 3/68
 USPC ............... 219/443.1, 449.1, 451.11, 452.12, 219/455.1, 460.1, 461.11, 254, 487, 490, 219/510, 525, 538
 See application file for complete search history.

(56) References Cited

U.S. PATENT DOCUMENTS

| 3,317,709 A | 5/1967 | Beasley |
| 3,606,612 A | 9/1971 | Reid, Jr. |
| 3,798,759 A | 3/1974 | Gerds |

(Continued)

FOREIGN PATENT DOCUMENTS

| EP | 1 400 151 B1 | 10/2004 | | |
| JP | 4268122 | * | 2/1991 | ............... F24C 7/04 |

(Continued)

OTHER PUBLICATIONS

ISA U.S. Patent and Trademark Office, International Search Report of PCT/US2010/040103, Aug. 20, 2010, 3 pages.

*Primary Examiner* — Galina Yushina
(74) *Attorney, Agent, or Firm* — Alleman Hall McCoy Russell & Tuttle LLP (57) ABSTRACT

Various embodiments of a portable cooking apparatus are disclosed. For example, in one embodiment, a portable cooking system is provided comprising a cooking plate having a continuous cooking surface, a heating element assembly disposed beneath the cooking surface, a temperature controller for varying the temperature of the cooking surface, and a base that supports the cooking plate on an underlying surface. The base comprises an integrally formed drip pan located beneath the cooking surface, the integrally formed drip pan comprising a recessed portion formed in a top surface of the base.

16 Claims, 8 Drawing Sheets

(51) Int. Cl.
*H05B 6/68* (2006.01)
*H05B 3/20* (2006.01)

(56) References Cited

U.S. PATENT DOCUMENTS

| | | |
|---|---|---|
| 3,824,984 A | 7/1974 | Swanson et al. |
| 3,843,313 A | 10/1974 | Helgeson |
| 3,895,216 A | 7/1975 | Hurko |
| 4,062,341 A | 12/1977 | Panzarella |
| 4,108,142 A | 8/1978 | Barson et al. |
| 4,206,341 A | 6/1980 | Leuschner et al. |
| 4,313,416 A | 2/1982 | Lau |
| 4,342,259 A | 8/1982 | Lee |
| 4,353,347 A | 10/1982 | Seed |
| 4,452,224 A | 6/1984 | Misumida |
| 4,452,587 A | 6/1984 | Laws et al. |
| 4,481,408 A | 11/1984 | Scheufler |
| 4,553,524 A | 11/1985 | Wheat et al. |
| 4,889,103 A | 12/1989 | Fraioli |
| 4,936,457 A | 6/1990 | Kicherer et al. |
| 4,957,039 A | 9/1990 | Reyes |
| 5,072,718 A | 12/1991 | Seal |
| 5,127,824 A | 7/1992 | Barker |
| 5,158,067 A | 10/1992 | Dutro et al. |
| 5,270,519 A | 12/1993 | Higgins |
| 5,413,087 A | 5/1995 | Jean |
| 5,676,043 A | 10/1997 | Best |
| 5,877,475 A * | 3/1999 | Hecht et al. ............... 219/448.11 |
| 6,150,636 A | 11/2000 | Bogdanski et al. |
| 6,189,530 B1 | 2/2001 | Shingler |
| 6,252,204 B1 | 6/2001 | Po-Hei |
| 6,369,366 B1 | 4/2002 | Mullen |
| 6,384,387 B1 | 5/2002 | Owens et al. |
| 6,410,892 B1 * | 6/2002 | Peschl et al. ................ 219/461.1 |
| 6,488,022 B2 | 12/2002 | Shingler |
| 6,529,686 B2 | 3/2003 | Ramanan et al. |
| 7,001,627 B2 | 2/2006 | Marson |
| 7,173,219 B2 | 2/2007 | Okajima et al. |
| 7,326,885 B2 | 2/2008 | Lockwood et al. |
| 7,326,886 B2 * | 2/2008 | Inoue ......................... 219/444.1 |
| 7,825,353 B2 | 11/2010 | Shingler |
| 2001/0035405 A1 | 11/2001 | Deo et al. |
| 2005/0199136 A1 | 9/2005 | Shingler |
| 2006/0107659 A1 | 5/2006 | Hodgson |
| 2006/0201496 A1 | 9/2006 | Shingler |
| 2007/0084853 A1* | 4/2007 | Shingler .................. 219/452.11 |
| 2007/0251456 A1 | 11/2007 | Herchen et al. |
| 2007/0257021 A1 | 11/2007 | Lockwood et al. |

FOREIGN PATENT DOCUMENTS

| | | |
|---|---|---|
| JP | H04268122 A | 9/1992 |
| WO | 01/65986 A1 | 9/2001 |
| WO | 2007/044646 A2 | 4/2007 |

* cited by examiner

ELECTRIC COOKING APPARATUS

CROSS-REFERENCE TO RELATED APPLICATIONS

This application claims priority to U.S. patent application Ser. No. 12/824,103, filed Jun. 25, 2010 and titled ELECTRIC COOKING APPARATUS, which claims priority to Provisional Patent Application Ser. No. 61/220,977, titled ELECTRIC COOKING APPARATUS and filed on Jun. 26, 2009. The entirety of each of these applications is hereby incorporated by reference.

BACKGROUND

Some portable cookers may include a solid cooktop. Unlike open cooktop grills, solid cooktops may cause food juices and residue to accumulate where the food is being cooked. This may have a deleterious effect on food taste and quality. Therefore, such cookers may require manual direction of accumulated grease and juice away from food with spatulas or scrapers.

SUMMARY

Various embodiments of portable cooking apparatuses are disclosed. For example, in one embodiment, a portable cooking system is provided comprising a cooking plate having a continuous cooking surface, a heating element assembly disposed beneath the cooking surface, a temperature controller for varying the temperature of the cooking surface, and a base that supports the cooking plate on an underlying surface. The base comprises an integrally formed drip pan located beneath the cooking surface, the integrally formed drip pan comprising a recessed portion formed in a top surface of the base.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
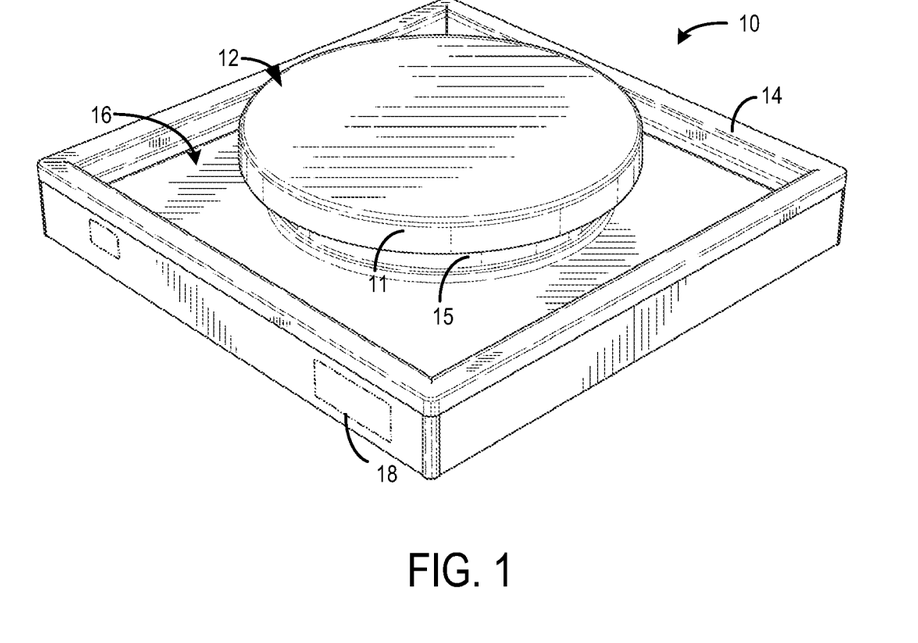
FIG. 1 shows a perspective view of an embodiment of a cooking apparatus according to the present disclosure.

Embodiments related to electric cooking apparatuses for both indoor and outdoor use are disclosed herein. FIG. 1 shows a perspective view of a first example embodiment of a cooking apparatus 10. Cooking apparatus 10 includes a cooking plate 11 having a substantially continuous cooking surface 12 and a heating surface disposed on an opposite side of cooking plate 11 as cooking surface 12. The term "substantially continuous" as used herein indicates that substantially the entire cooking surface is useable for the cooking of foods, as opposed to a stove top having heating elements spaced apart by non-cooking surfaces. In some embodiments, cooking plate 11 is formed at least in part from metal. This may permit cooking plate 11 to change shape in response to heating and/or cooling of cooking plate 11, which may reduce internal stresses within cooking plate 11 compared to rigid cookers, such as ceramic cookers. This may help to prolong a service life of cooking plate 11. As such, depending on the configuration of cooking plate 11, in some embodiments, a curvature (such as a convexity) of cooking plate 11 may change in response to thermal expansion and/or contraction. This may improve an ability of cooking surface 12 to shed juices during cooking. Example metals include, but are not limited to, stainless steel and mild steel.

In some embodiments, cooking surface 12 and/or other portions of cooking plate 11 may be coated, for example, with a ceramic layer bonded to the metal via a sintering process, a deposition process, and/or a reaction bonding process. Additionally or alternatively, in some embodiments, cooking surface 12 may be oil-seasoned or otherwise treated.

While the embodiment of cooking plate 11 depicted herein is shown as having a generally flat, circular cooking surface, it will be appreciated that cooking surface 12 may have any suitable shape, profile, surface texture, etc. Examples of suitable shapes include but are not limited to oval, rectangular, other curvilinear and/or polygonal shapes, and combinations thereof.

Cooking plate 11 may be of any suitable thickness. In some embodiments, cooking plate 11 may be between 3/16ths of an inch and 1/4 of an inch thick, though it will be appreciated that any other suitable thickness may be employed, including thicknesses that vary across cooking plate 11. Cooking plate 11 may also be of any suitable size. In some embodiments, cooking plate 11 may have a diameter in a range of, but not limited to, diameters between 400-640 millimeters. In one specific embodiment, cooking plate 11 has a diameter of 508 millimeters. In other embodiments, cooking plate 11 may have a diameter outside of this range.

Figure 12:
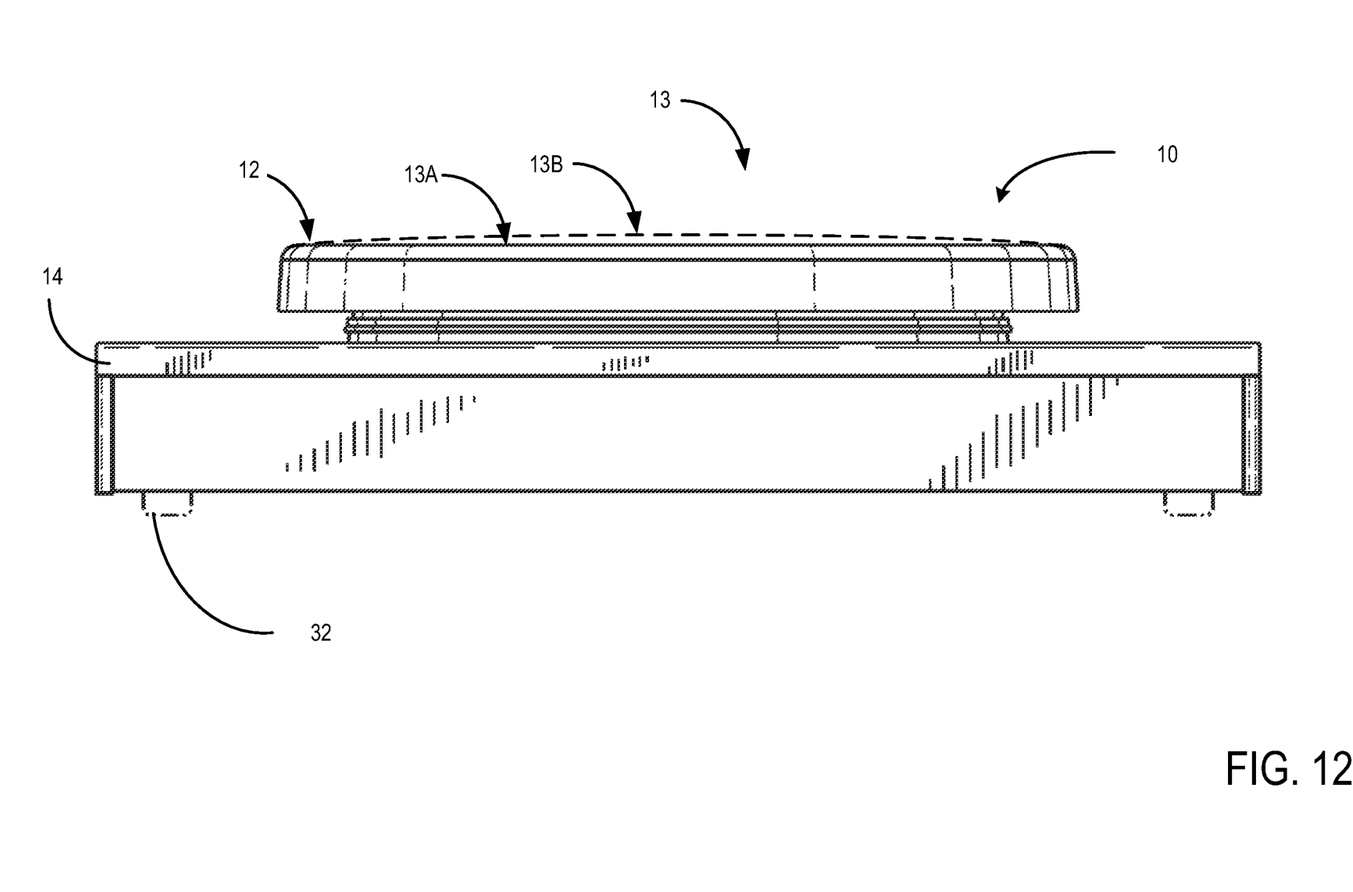
FIG. 12 shows a side view of an embodiment of an electric cooking apparatus schematically illustrating a change in curvature according to the present disclosure.

In some embodiments, cooking surface 12 may have a flat configuration edge-to-edge. In some other embodiments, cooking surface 12 may be convex (crowned) edge-to-edge. For example, FIG. 12 shows an embodiment of a cooking apparatus having a cooking surface profile 13 that is convex. Where cooking plate 11 is formed at least in part from metal, cooking surface 12 may have a cooking surface profile 13 that varies as a function of cooking surface temperature in response to thermal expansion and contraction.

As one specific example, cooking surface profile 13 may vary in convexity responsive to heating and/or cooling of the cooking plate 11. As shown in FIG. 12, for example, cooking surface 12 has a first cooking surface profile 13A at a first, lower temperature. Upon heating to a second, higher temperature, cooking surface 12 is shown exhibiting a second cooking surface profile 13B with a greater convexity. It will be appreciated that the example cooking surface profiles 13A and 13B shown in FIG. 12 are exaggerated for illustrative purposes. In one specific, non-limiting embodiment, a center-to-edge displacement of cooking surface profile 13 may vary from one-eighth of an inch to three-sixteenths of an inch as cooking plate 11 is heated or cooled.

While the embodiment shown in FIG. 12 depicts cooking plate 11 as having a first upward convexity at a first, lower temperature and a second upward convexity at a second, higher temperature, such that the first upward convexity is less convex than the second upward convexity, it will be appreciated that in some embodiments, cooking surface profile 13 may transition from a substantially flat profile to a convex profile on heating of cooking plate 11.

Returning to FIG. 1, cooking apparatus 10 may also include a base 14 configured to support cooking surface 12 and to house various electronic components of cooking apparatus 10. In some embodiments, base 14 may include a drip pan 16 is provided to prevent spillovers while using cooking apparatus 10. As depicted in the embodiment shown in FIG. 1, drip pan 16 has a rectangular configuration and a continuous construction such that drip pan 16 is integrally formed from base 14, such that drip pan 16 includes a recessed portion formed in a top surface of base 14. In some embodiments, drip pan 16 may be made integral with base 14 by machining drip pan 16 from a single sheet of stock (e.g., by rolling and/or slip-forming) to form the recessed portion, and then brazing or welding the machined drip pan 16 to a lower portion of base 14. In the depicted embodiment, a distance around the outside perimeter of the square drip pan and the inner circular flange and the underside of the cooking surface is configured to allow of easy reach-in cleaning with a wiping cloth. However, it will be appreciated that other suitable shapes and/or configurations of the integrally formed drip pan may be employed in other embodiments.

Figure 4:
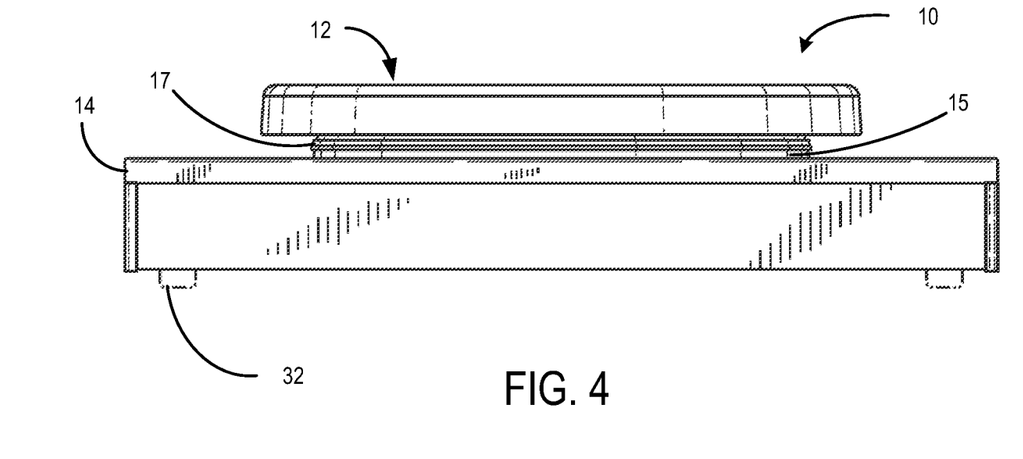
FIG. 4 shows a side view of another embodiment of a cooking apparatus according to the present disclosure.

It will be appreciated that base 14 and/or drip pan 16 may be constructed out of any suitable material, including but not limited to stainless steel, aluminum, various polymers, composites, etc. In some embodiments, drip pan 16 may include an integrally formed pedestal 15, which may be formed when drip pan 16 is machined from stock. Pedestal 15 is configured to couple cooking plate 11 to drip pan 16 with a gasket 17, as shown in FIG. 4. In one scenario, gasket 17 may be formed from a suitable elastomeric material, such as silicone. However, it will be appreciated that in some embodiments, gasket 17 may be formed from metal or any other material suited to a particular application. In some embodiments, an inner pedestal member (not shown) coupled to cooking plate 11 may be coupled, via gasket 17, to pedestal 15. In some embodiments, the inner pedestal member may be formed from stainless steel, though it will be appreciated that any suitable material may be employed.

Returning to FIG. 1, cooking apparatus 10 includes a control system having a control panel 18. Control panel 18 may be configured to allow adjust various functions of the cooking apparatus, such as temperatures of heating zones, an on/off state of the cooking apparatus, etc. The heating zones are discussed in detail herein with regard to FIGS. 8 and 9. The control panel may utilize buttons, knobs, touch-screen(s), and/or any other suitable input device to allow control of the cooking apparatus.

Figure 2:
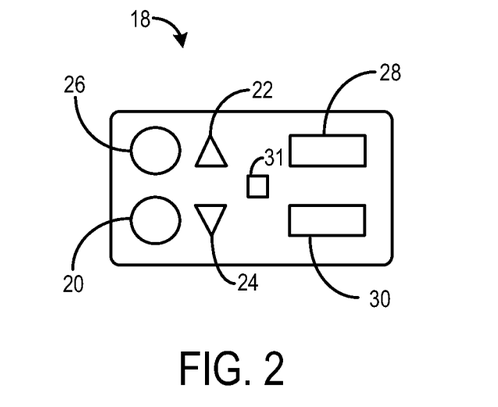
FIG. 2 schematically shows an embodiment of a control panel according to the present disclosure.

FIG. 2 illustrates a detailed view of an embodiment of a control panel 18. It will be appreciated that the elements shown in the embodiment of control panel 18 depicted in FIG. 2 are provided for illustrative purposes only; thus, control panel 18 is not limited to the example shown in FIG. 2. The depicted embodiment of control panel 18 includes a "zone" button 20, configured to select the heating zone being adjusted. Additionally, a plurality of temperature control buttons, 22 and 24, are provided to facilitate adjustment (e.g. increase and decrease) of the temperature of the selected heating zone. Thus, different regions of cooking surface 12 may be controllably maintained at different temperatures. In some embodiments, control panel 18 may further include a power button 26.

Control panel 18 comprises a first display field 28 and a second display field 30. First display field 28 may be configured to present a temperature of a first heating zone and second display field 30 may be configured to display a temperature of a second heating zone. Each display field may include any suitable display device, including but not limited to light-emitting diodes, liquid crystal displays, organic light emitting devices, etc. In some embodiments, control panel 18 may include a "hot surface warning" icon 31 indicating that cooking surface 12 exceeds a threshold temperature. In some embodiments, the threshold temperature may be 150 degrees Fahrenheit. In other embodiments, another suitable threshold temperature may be utilized.

The control system may also include a temperature controller (not shown) configured to operate cooking apparatus 10 based upon the temperature for each heating zone as selected by a user. When only a single heating zone is active, the controller is configured to provide power as needed to that heating zone to keep the temperature at the set temperature. When more than one heating zone is active, the controller may be configured to alternately supply power to each heating zone, such that only one heating zone at a time is supplied with power. In this way, power may be delivered to the heating zones in a cyclical, serial manner, thereby decreasing the overall power consumption of cooking apparatus 10 compared to the provision of power to multiple heating zones in parallel. It will be appreciated that the time intervals may be selected and/or adjusted to maintain the inner and the outer heating zones at desired temperatures, which may be the same or different. In other embodiments, power may be provided to the multiple heating zones in parallel.

Figure 3:
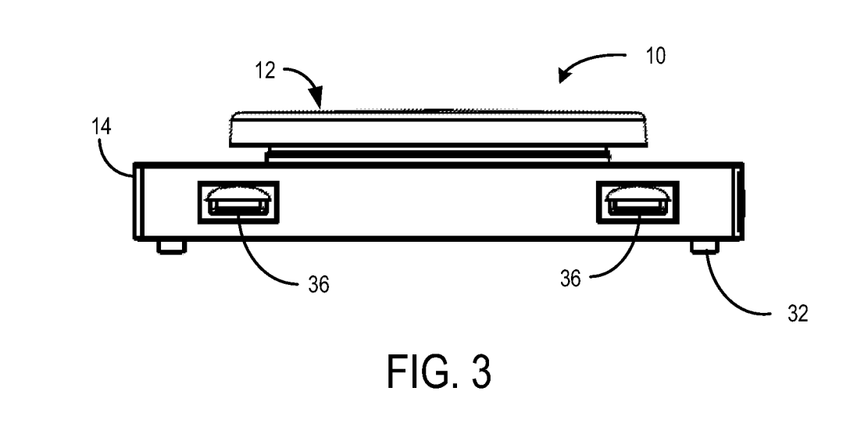
FIG. 3 shows a side view of an embodiment of a cooking apparatus according to the present disclosure.

FIG. 3 shows a side view of an embodiment of cooking apparatus 10. As shown in FIG. 3, cooking apparatus 10 includes a two carrying handles 36. Carrying handles 36 may be used for transporting some embodiments of cooking apparatus 10. However, it will be appreciated that carrying handles 36 are optional. For example, FIG. 4 shows a side view of another embodiment of cooking apparatus 10 that omits carrying handles 36.

Figure 5:
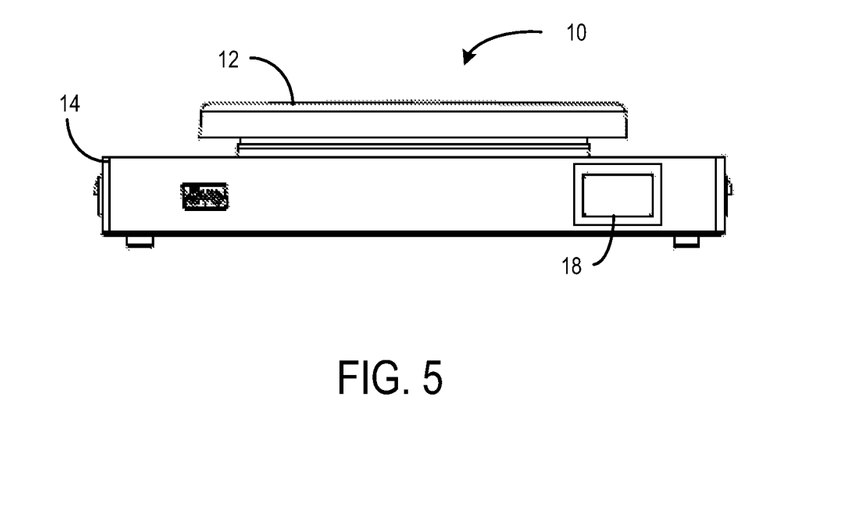
FIG. 5 shows a front view of an embodiment of a cooking apparatus according to the present disclosure.
Figure 6:
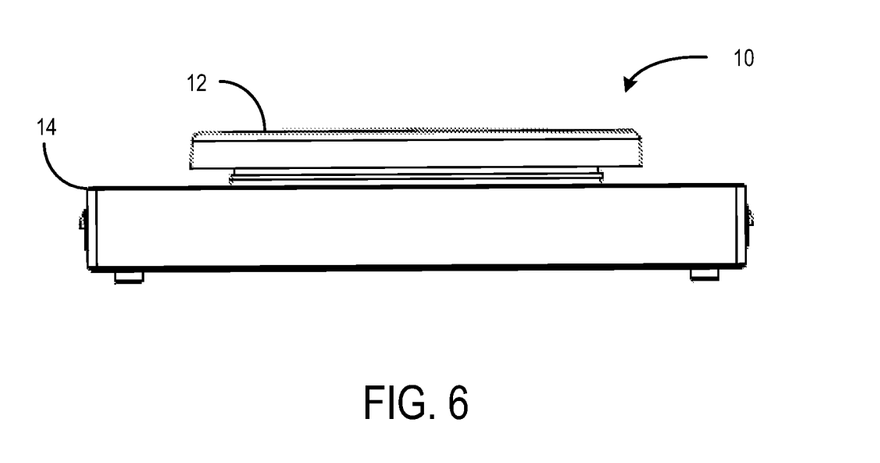
FIG. 6 shows a rear view of an embodiment of a cooking apparatus according to the present disclosure.
Figure 7:
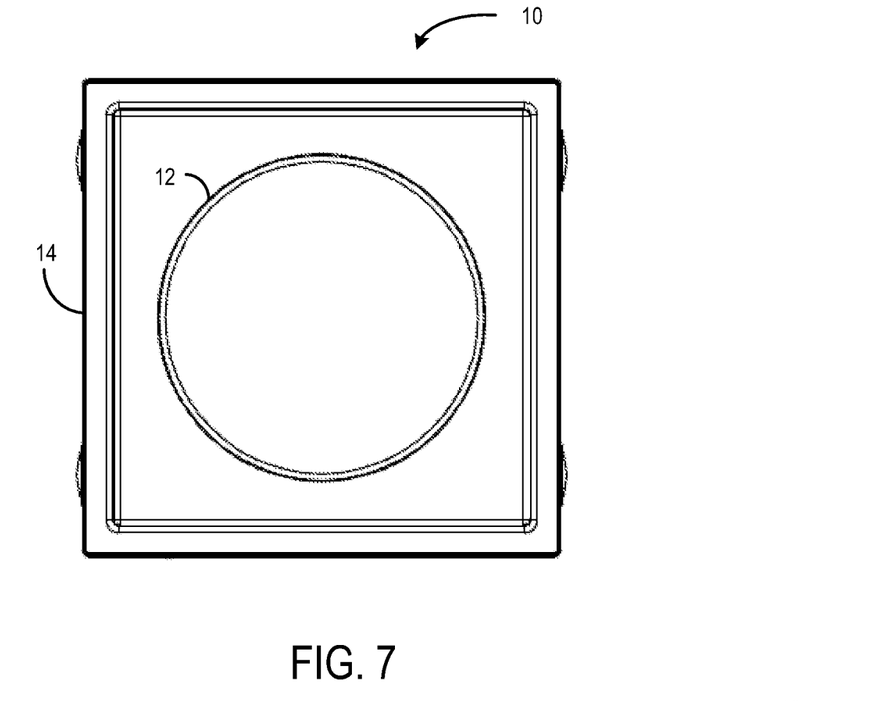
FIG. 7 shows a top view of an embodiment of a cooking apparatus according to the present disclosure.

FIGS. 5 and 6 show a front view and a rear view, respectively, of an embodiment of cooking apparatus 10, and FIG. 7 shows a top view of an embodiment of cooking apparatus 10.

Figure 8:
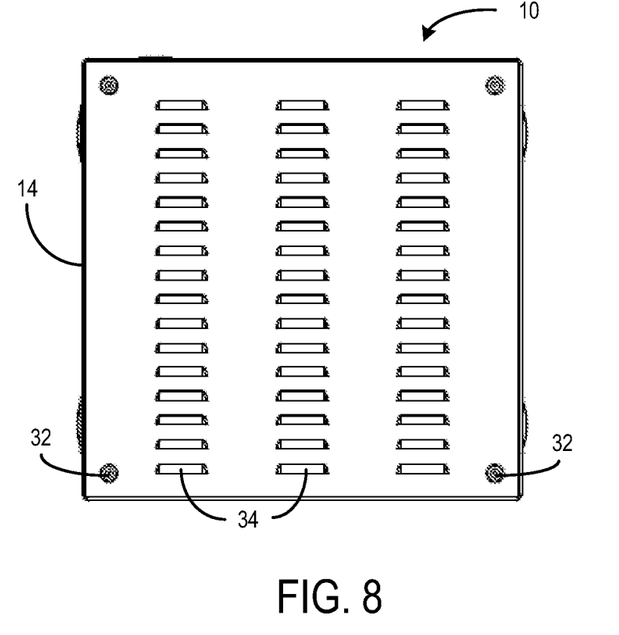
FIG. 8 shows a bottom view of an embodiment of a cooking apparatus according to the present disclosure.

FIG. 8 shows a bottom view of base 14 included in an embodiment of cooking apparatus 10. Base 14 may include optional feet 32 positioned adjacent to each corner of the cooking apparatus, or in any suitable location. Additionally, vents 34 may be provided in some embodiments to facilitate cooling of the electronic components located inside cooking apparatus 10. In some embodiments, the width as well as the length of base 14 may be of a dimension falling within a non-limiting range of 508 millimeters to 1016 millimeters; in one specific embodiment, the length and width of base 14 is approximately 737 millimeters. In other embodiments, base 14 may have any other suitable shape, size, number of vents 34, number of feet 32, etc.

Cooking apparatus 10 may have any suitable height. In some embodiments, the height of the cooking apparatus, measured from the base to the cooking surface, may be within a non-limiting range of 76 millimeters to 381 millimeters. In one specific embodiment, the height may be approximately 197 millimeters. Further, in some embodiments, a height of base 14 may be within a non-limiting range of 76 millimeters to 254 millimeters. In one specific embodiment, the height of base 14 may be approximately 117 millimeters. It will be appreciated that these specific dimensions are described for illustrative purposes, and that these dimensions may have any other suitable values.

Figure 9:
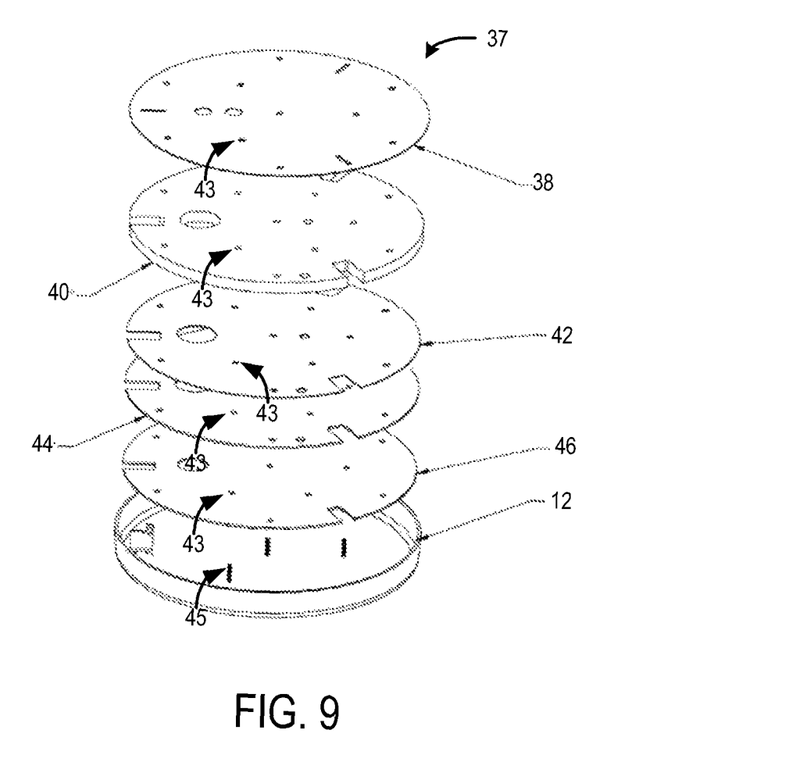
FIG. 9 shows an exploded view of an embodiment of a heating element assembly and an embodiment of a cooking plate according to the present disclosure.

FIG. 9 illustrates an exploded view of an embodiment of a heating element assembly 37 suitable for use with cooking apparatus 10. The depicted heating element assembly 37 includes a heat shield 38, which may be formed from metal, such as mild or stainless steel. Heating element assembly 37 is also shown as including two insulating sheets: a first insulating sheet 40, which may be, as a non-limiting example, an insulating blanket, and a second insulating sheet 44, which may be, as a non-limiting example, a ceramic insulator. In some embodiments, a thickness of first insulating sheet 40 may be greater than that of second insulating sheet 44, though it will be appreciated that in some embodiments, another suitable thickness relationship may exist between first insulating sheet 40 and second insulating sheet 44. In some embodiments, first insulating sheet 40 may have a thickness of one inch and second insulating sheet 44 may have a thickness of approximately 0.125 inches. In other embodiments, these components may have other suitable thicknesses. While the depicted embodiment is shown with two insulating sheets, it will be appreciated that, in some embodiments, three or more insulating sheets may be provided. Alternatively, in some embodiments, only a single insulating sheet may be provided, or insulating sheets may be omitted entirely.

Heating element assembly 37 also includes a compression plate 42. Compression plate 42 compressively couples heating element 46 (described in more detail below) to the heating surface of cooking plate 11. Thus, compression plate 42 may urge heating element 46 against the heating surface and assist in providing conductive heat transfer between heating element 46 and cooking plate 11. In some embodiments, compression plate 42 may be a flexible compression plate configured to maintain contact between heating element 46 (which may be flexible, as described in more detail below) and cooking plate 11 as cooking surface profile 13 changes shape due to thermal expansion and/or thermal contraction.

In some embodiments, compression plate 42 may be formed at least in part from metal and may be configured such that a thermal mass of compression plate 42 is less than a thermal mass of cooking plate 11, so that more heat is transferred to the cooking plate than to the compression plate. For example, in some embodiments, a thickness of cooking plate 11 may be greater than a thickness of compression plate 42. In more specific embodiments, a thickness of compression plate 42 may be in a non-limiting range of 0.020-0.125 inches and a thickness of cooking plate 11 may be in a non-limiting range of ³⁄₁₆ths-¼ inches.

Figure 10:
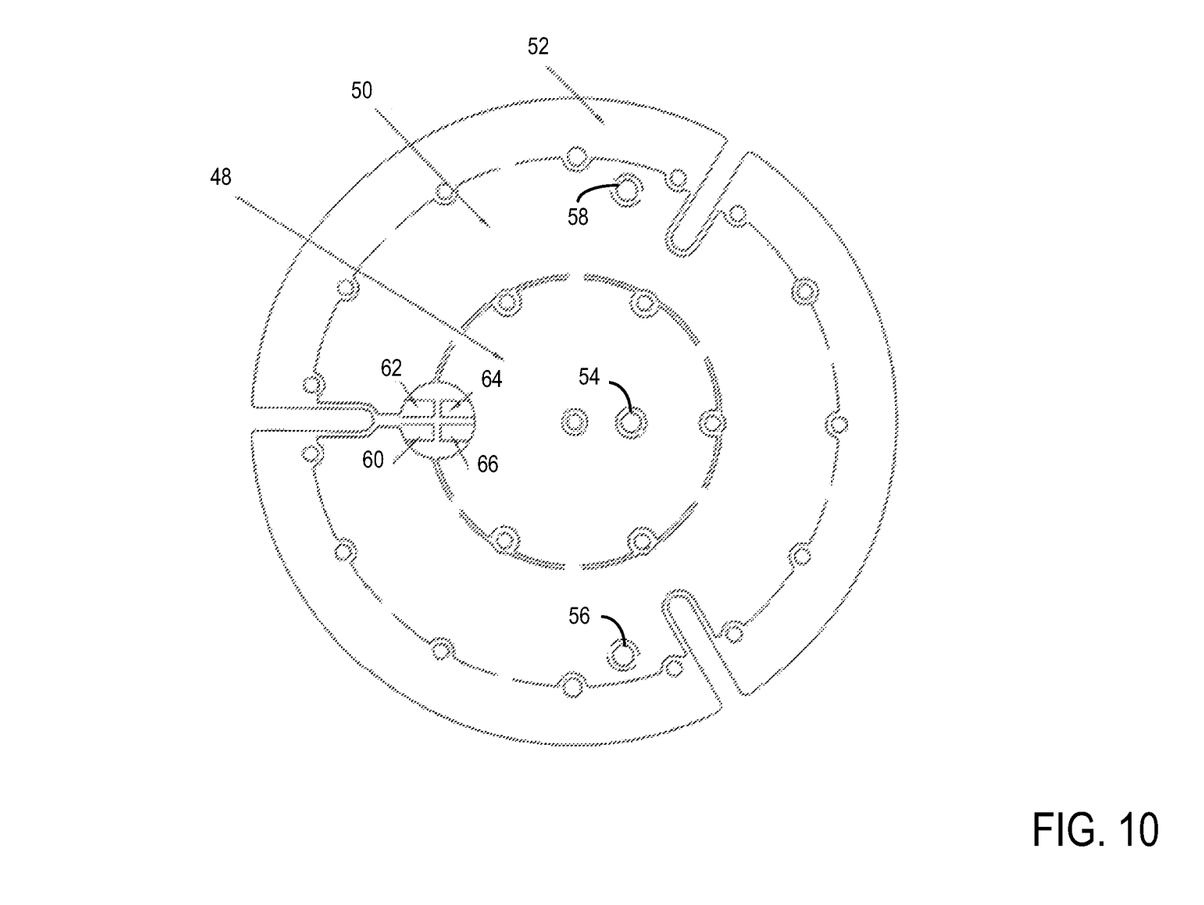
FIG. 10 shows an embodiment of a heating element according to the present disclosure.

FIG. 10 illustrates an example embodiment of heating element 46. In some embodiments, heating element 46 may be flexible, such that heating element 46 may flex to match the conformation of cooking plate 11 as it thermally expands and contracts. This may assist conductive heat transfer between heating element 46 and the heating surface of cooking plate 11 in embodiments where cooking surface profile 13 varies in response to heating and/or cooling of cooking plate 11.

In some embodiments, heating element 46 may be a resistance-type heater (e.g., an etched mica heating element). For example, heating element 46 may be a resistance-type heater constructed from a thin metal foil of NiCr, stainless steel, or any other suitable metal for constructing a resistance heater. The thin metal foil may be insulated between two layers of mica insulation to provide insulating protection from the electrically charged metal foil and the adjoining metal cooking surface and support structure compressing the heating element to the cooking surface.

Temperature sensors (not shown) may be mounted to or integrated with cooking surface 12 in one or more locations to measure the cooking surface temperature. Any suitable temperature sensor(s) may be used, including but not limited to one or more thermocouples. In the embodiment shown in FIG. 10 is configured so that three temperature sensors may be mounted to the cooking surface, where one sensor may be provided for the inner heating zone and two sensors may be provided for the outer heating zone. Holes (54, 56, and 58) may be provided through the heating element assembly so that the temperature sensors may access an underside of the cooking surface. Signals from the temperature sensors may be provided to the controller to allow control of the cooking surface temperature. Examples of typical cooking surface temperatures include, but are not limited to, temperatures in a range of 225-475 degrees Fahrenheit. It will be understood that any other suitable number of temperature sensors other than three may be used to monitor the cooking surface temperature.

In some embodiments, heating element 46 may include two or more heating zones. As depicted in FIG. 10, heating element 46 includes an inner heating zone 48 and an outer heating zone 50. As such, heating element 46 includes terminals for connecting the inner and outer heating zones to power supplies. In embodiment depicted in FIG. 10, terminals 60 and 62 connect inner heating zone 48 to the heating circuit and the third and fourth terminals 64 and 66 connect outer heating zone 50 to the heating circuit. In other embodiments, any other suitable arrangement of terminals may be utilized. In some embodiments, heating element 46 may include a peripheral non-heated zone 52.

Typical voltages used to power heating element 46 include 120 VAC/60 Hz provided using a 3-wire conduit. Embodiments also may be configured to utilize other voltages, such as 220 VAC/50-60 Hz, or any other suitable voltage and/or frequency. In one specific embodiment, each of inner heating zone 48 and outer heating zone 50 may be configured to utilize a power of 1828 Watts. In other embodiments, any other suitable amount of power may be supplied to each heating zone.

In some embodiments, inner heating zone 48 and outer heating zone 50 may have different power densities. For example, for the above-disclosed etched mica heating element, outer heating zone 50 may have a power density of 1.56 Watts/cm$^2$, while inner heating zone 48 may have a power density of 3.67 Watts/cm$^2$. Therefore, to maintain a desired device maximum power of 1828 Watts, power may alternately be supplied to inner heating zone 48 for a first, shorter amount of time, and to outer heating zone 50 for a second, longer amount of time, in a cyclical, serial manner. In one specific embodiment, power is supplied to inner heating zone 48 for approximately five seconds, and then to outer heating zone 50 for approximately ten seconds. In this manner, two 1828-Watt heating zones may be powered without exceeding a total power consumption of 1828 Watts. Further, the relative time durations at which power is supplied to the heating zones may be varied depending upon the temperatures desired for each heating zone and other operating variables. While the depicted heating element is disclosed as heating generally concentric heating zones, it will be appreciated that the heating zones may be configured to create separate heating regions of any other suitable shape. Further, any other suitable number of heating zones other than two may be used.

Heating element assembly 37 is coupled to cooking surface 12 via a plurality of connectors 45. In some embodiments, connectors 45 may couple heating element assembly 37 to cooking plate 11 so that heating element 46 is compressively retained against the heating surface of cooking plate 11 under the urging of compression plate 42. This may assist with conductive heat transfer to cooking plate 11 in embodiments where cooking surface profile 13 varies on heating and/or cooling. Connectors 45 may be distributed in any suitable pattern across the heating surface of cooking plate 11. Example patterns include, but are not limited to, radial patterns and patterns concentric with a center point of cooking plate 11. Any suitable number of connectors 45 may be employed in such patterns. The number of connectors 45 employed may vary with a radial size of cooking plate 11 or with other factors, such as materials properties of cooking plate 11, compression plate 42, connectors 45, etc.

In some embodiments, connectors 45 may include posts extending downward from the heating surface of cooking plate 11 in a direction normal to the heating surface or in other suitable directions. Each post may include threads to allow heating element 46 to be compressively sandwiched between cooking plate 11 and compression plate 42 with a retaining nut. In such a scenario, the retaining nut may provide a compressive force for coupling compression plate 42 and cooking plate 11. Thus, heating element 46 is retained against the heating surface as compression plate 42 and heating element 46 flex to match the changing conformation of cooking plate 11 during heating and cooling.

In some embodiments employing posts and retaining nuts, each retaining nut may be tightened to a threshold torque value, which may vary from nut to nut. This may permit preselection and/or adjustment of compressive forces and/or conformation directions at cooking plate 11, compression plate 42, or throughout heating element assembly 37. It will be appreciated that one or more suitable washers may be employed in such embodiments.

In some embodiments, each of such posts may be removably or permanently coupled to cooking plate 11. For example, in one scenario, connectors 45 may include a plurality of studs welded to the heating surface of cooking plate 11. In another scenario, connectors 45 may include a plurality of studs inserted into companion holes formed in cooking plate 11.

Additionally or alternatively, in some embodiments, connectors 45 may include clips that are each removably or permanently coupled to cooking plate 11. A plurality of clips may be used to sandwich heating element 46 between cooking plate 11 and compression plate 42, with the clips providing a compressive force for coupling cooking plate 11 and compression plate 42. Thus, as compression plate 42 flexes to match the conformation of cooking plate 11 during heating and cooling, heating element 46 is retained against the heating surface. Such clips may be configured to provide a preselected compressive force, which may permit preselection of conformation directions at cooking plate 11, compression plate 42, or throughout heating element assembly 37.

In some embodiments, various sub-assembly elements of heating element assembly 37, such as heat shield 38, compression plate 42, heating element 46 and/or one or more of the insulating sheets may include companion features 43 configured to receive connectors 45. For example, in some embodiments where a plurality of posts are provided, one or more posts may be configured to extend through complementary holes formed in compression plate 42, forming one or more post-hole pairs. Such post-hole pairs may assist with aligning compression plate 42 with cooking plate 11 and may provide an approach to couple other elements of heating element assembly 37 with cooking plate 11. In some embodiments where a plurality of clips are provided, one or more clips may be configured to couple with or pass through a notch formed in a perimeter edge of one or more of the sub-assembly elements. Additionally or alternatively, one or more sub-assembly elements may include a plurality of contact pads configured to couple with the plurality of clips.

In some embodiments, one or more companion features 43 and corresponding connectors 45 may be sized so that a loose fit is formed there between. The resulting clearance may prevent damage to connector 45 and/or to the structure in which companion feature 43 is formed that might otherwise result during expansion and/or contraction of cooking plate 11, which may have a different coefficient of thermal expansion from one or more constituents of heating element assembly 37.

In one example, complementary holes may be sized to allow a corresponding post to pass loosely through the hole yet to permit a nut to provide a compressive force within heating element assembly 37 (either alone or with a suitable washer). In one specific embodiment, for one or more post-hole pairs, a smallest dimension of the complementary hole may be at least ½ inch in diameter and the largest dimension of the post may be less than ⅛ inch in diameter.

While the above-described embodiments relate to embodiments depicted herein, it will be appreciated that, in other embodiments, heating element assembly 37 may include additional and/or alternate components arranged in any suitable spatial arrangement.

Figure 11:
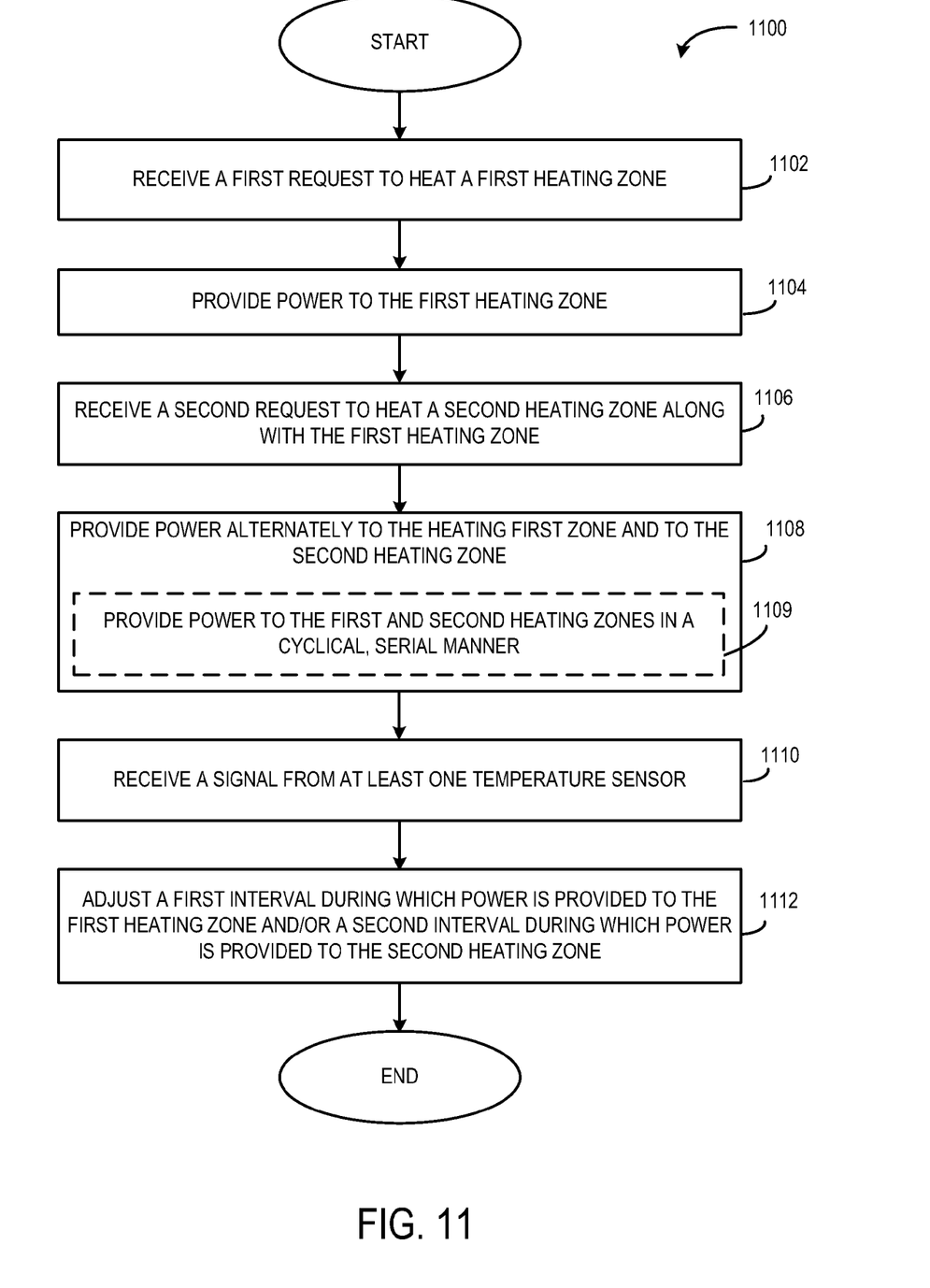
FIG. 11 shows a flowchart for an embodiment of a method of heating a plurality of heating zones in an electric cooking apparatus according to the present disclosure.

FIG. 11 illustrates an embodiment of a method 1100 for operation of a cooking apparatus. The method may be implemented via the cooking apparatus described above. Alternatively, the method may be implemented via another suitable cooking apparatus.

Method 1100 comprises, at 1102, receiving a first request to heat a first heating zone. In some embodiments, the request may be generated via a user input to a control panel. At 1104, method 1100 comprises providing power to the first heating zone after the request to heat the first heating zone is received.

At 1106, method 1100 comprises receiving a second request to heat a second heating zone along with the first heating zone. In some embodiments, the second request may be generated via a user input to a control panel. At 1108, method 1100 comprises providing power alternately to the first heating zone and to the second heating zone. It will be appreciated that, in some embodiments, a first time interval during which power is provided to the first heating zone may be different from a second time interval during which power is provided to the second heating zone. In some other embodiments, the first and second time intervals may be identical. In some embodiments, providing power at 1108 may comprise, at 1109, providing power to the first and the second heating zones in a cyclical, serial manner.

At 1110, method 1100 comprises receiving a signal from at least one temperature sensor. In some embodiments, a plurality of signals may be received from a plurality of temperature sensors. The temperature sensors may be attached to one or more of the heating zones. At 1112, method 1100 comprises, after receiving at least one signal, adjusting a first interval during which power is provided to the first zone and/or a second interval during which power is provided to the second zone.

In the foregoing specification, various features are described with reference to specific embodiments thereof. However, it will be evident that various modifications and changes can be made thereto without departing from the broader spirit and scope of the disclosure. The specification and drawings are, accordingly, to be regarded in an illustrative rather than a restrictive sense.

Furthermore, it will be appreciated that the various embodiments of heating elements, cooking surfaces, base and drip pan constructions, etc. are only examples, and are not to be considered in a limiting sense because numerous variations are possible. The subject matter of the present disclosure includes all novel and non-obvious combinations and sub-combinations of the various features, functions, and/or properties disclosed herein.

The invention claimed is:

1. A cooking system, comprising:
    a cooking plate having a continuous cooking surface;
    a heating element assembly disposed beneath the cooking surface and comprising a flexible heating element compressively coupled with the cooking plate via a flexible compression plate, the flexible compression plate being configured to compressively couple the flexible heating element to the cooking plate to maintain contact between the flexible heating element and the cooking plate as the cooking surface changes shape due to thermal expansion and/or thermal contraction;
    a temperature controller for varying a temperature of the cooking surface; and
    a base that supports the cooking plate on an underlying surface.

2. The cooking system of claim 1, wherein the base includes a pedestal coupled to the cooking plate.

3. The cooking system of claim 1, wherein the cooking plate has a first upward convexity at a first, lower temperature and a second upward convexity at a second, higher temperature, and wherein the first upward convexity is less convex than the second upward convexity.

4. The cooking system of claim 1, wherein the flexible heating element comprises a mica heating element.

5. A portable cooking system comprising:
    a cooking plate having a continuous cooking surface with a cooking surface profile that varies in convexity responsive to heating and/or cooling of the cooking plate;
    a heating element assembly disposed beneath the cooking surface, the heating element assembly comprising:
        a flexible compression plate, and
        a flexible heating element disposed between the flexible compression plate and the cooking plate; and
    one or more connectors joining the heating element assembly to a heating surface of the cooking plate, the heating surface being disposed on an opposite side of the cooking plate as the cooking surface.

6. The portable cooking system of claim 5, wherein the heating element assembly comprises a mica heating element.

7. The portable cooking system of claim 5, wherein the one or more connectors comprise a plurality of posts extending downward from a heating surface of the cooking plate in a direction normal to the heating surface, the heating surface being disposed on an opposite side of the cooking plate as the cooking surface.

8. The portable cooking system of claim 7, wherein the plurality of posts are welded to the heating surface.

9. The portable cooking system of claim 7, wherein the plurality of posts extend through complementary holes formed in the flexible compression plate to form a plurality of post-hole pairs for aligning the flexible compression plate to the cooking plate, and wherein, for each post-hole pair, a smallest dimension of a complementary hole is at least one-half of an inch in diameter and a largest dimension of the post is less than one-eighth of an inch in diameter.

10. The portable cooking system of claim 5, wherein the heating element assembly further comprises one or more insulating sheets and a heat shield.

11. The portable cooking system of claim 5, wherein the flexible compression plate is formed at least in part from metal, and wherein a thermal mass of the flexible compression plate is less than a thermal mass of the cooking plate so that more heat is transferred to the cooking plate than to the flexible compression plate.

12. The portable cooking system of claim 11, wherein the flexible compression plate has a thickness that is less than a thickness of the cooking plate.

13. The portable cooking system of claim 12, wherein the cooking plate has a thickness of between three-sixteenths of an inch and one-quarter of an inch, and wherein the flexible compression plate has a thickness of between 0.02 inch and 0.125 inch.

14. A portable cooking system, comprising:
    a cooking plate having a continuous cooking surface with a cooking surface profile that varies in convexity responsive to heating and/or cooling of the cooking plate;
    a heating element assembly disposed beneath the cooking surface, the heating element assembly comprising:
        a flexible metal compression plate, and
        a heating element disposed between the flexible metal compression plate and the cooking plate; and
    a plurality of posts joining the heating element assembly to the cooking plate so that the heating element is compressively retained against a heating surface of the cooking plate by the flexible metal compression plate as the cooking surface profile varies, the heating surface being disposed on an opposite side of the cooking plate as the cooking surface.

15. The portable cooking system of claim 14, wherein the cooking plate has a first upward convexity at a first, lower temperature and a second upward convexity at a second, higher temperature, and wherein the first upward convexity is less convex than the second upward convexity.

16. The portable cooking system of claim 15, wherein a thermal mass of the flexible metal compression plate is less than a thermal mass of the cooking plate so that more heat is transferred to the cooking plate than to the flexible metal compression plate.

* * * * *